United States Patent
Krause

[11] Patent Number: 5,988,318
[45] Date of Patent: Nov. 23, 1999

[54] CONNECTION HOOK

[75] Inventor: Guenther Krause, Alsfeld, Germany

[73] Assignee: Krause-Werk GmbH & Co. KG, Alsfeld-Altenburg, Germany

[21] Appl. No.: 08/765,830

[22] PCT Filed: May 24, 1995

[86] PCT No.: PCT/EP95/01973

§ 371 Date: Dec. 30, 1996

§ 102(e) Date: Dec. 30, 1996

[87] PCT Pub. No.: WO96/01352

PCT Pub. Date: Jan. 18, 1996

[30] Foreign Application Priority Data

Jul. 1, 1994 [DE] Germany ................. 94 10 465 U

[51] Int. Cl.[6] .................................................. E04G 7/30
[52] U.S. Cl. ................................. 182/222; 182/186.7
[58] Field of Search ................................. 182/222, 119, 182/186.7, 186.8; 403/49

[56] References Cited

U.S. PATENT DOCUMENTS 2,997,767  8/1961  Grover et al. .

FOREIGN PATENT DOCUMENTS

| 348885 | 1/1990 | European Pat. Off. ............... 182/222 |
| 1 429 423 | 1/1966 | France . |
| 2 083 214 | 12/1971 | France . |
| 93 14 353 | 2/1994 | Germany . |
| 901351 | 7/1962 | United Kingdom .................... 403/49 |
| 1 250 607 | 10/1971 | United Kingdom . |
| 1515927 | 6/1978 | United Kingdom .................... 483/49 |
| 508028 | 10/1992 | United Kingdom .................... 182/224 |

*Primary Examiner*—Alvin Chin-Shue
*Attorney, Agent, or Firm*—Flynn, Thiel, Boutell & Tanis, P.C.

[57] ABSTRACT

A connection hook for scaffoldings must, on the one hand, permit a quick and secure connection of two scaffolding parts, and, on the other hand, be able to be manufactured inexpensively and durably and be connectable to scaffolding elements of very different designs. The connection hook of the invention is for this purpose designed as an extruded part, which cooperates with a part, which is always equally shaped on entirely different scaffolding elements, and thereby positively locks the part within the hook opening, and secures this positive lock through a releasable frictional interlock.

13 Claims, 2 Drawing Sheets

CONNECTION HOOK

FIELD OF THE INVENTION

The invention relates to a connection hook for the releasable connection of two scaffolding elements, whereby the connection hook, which is stationarily positioned on a first scaffolding element, can support a profiled part of a second scaffolding element, partly covering said part and being interlockable to same.

BACKGROUND OF THE INVENTION

Connection hooks of this type are in particularly great demand for the construction of scaffoldings in order to be able to securely and quickly releasably connect scaffolding frames with one another, platforms, spars, reinforcements and other scaffolding elements, in particular for scaffoldings consisting of premanufactured elements. Whereas the shape of the first scaffolding element at the connecting point for the connection hooks can be generally shaped as desired and only its secure fastening must be guaranteed, the part of the second element, which part is received on the connection hook, in most cases a crossbar or a short bracket on a scaffolding frame, is always designed with a constant cross section adapted to the shape of the hook opening of the associated connection hook.

SUMMARY OF THE INVENTION

The purpose of the invention is to provide such connection hooks, which are needed in very large quantities, in such a manner that they are basically manufactured out of one workpiece, which can be produced via a highly productive process, in particular via an extrusion process, and can be completed in a simple manner with parts, which themselves can be manufactured inexpensively in large quantities or consist of commercially available standard parts.

The purpose is attained according to the invention by the connection hook being designed as a hollow extruded part in cross section, by providing two flat, parallel surfaced stem segments on the hollow extruded port, which stem segments, spaced from one another, receive a flat safety pawl therebetween, by the safety pawl being able to positively lock the part when said pawl is swivelled or moved between the stem segments, locking the cross section of the part in a hook opening provided in the stem segments, and by the stem segments being connected by at least one cross segment, and said cross segment being shaped such that it defines a bearing surface positioned perpendicularly to the cross section of the hollow extruded part and the surfaces of the stem segments in such a manner that it is suited for a flangelike fastening of the connection hook to the first scaffolding element.

Such a connection hook can be manufactured very inexpensively as hollow extruded parts cut transversely with respect to the longitudinal axis of an extruded section, whereby the stem segments do not need to be connected at their end remote from the cross segment, as a rule, however, they are even connected with one another at their end so that the hollow extruded part has a closed cross section. The arrangement allows the safety pawl to be constructed as a simple stamped metal part pivotal on a simple swivel axle consisting of a commercially available bolt, which is stationarily fixed in the stem segments. All parts needed for the connection hook can in this manner be inexpensively manufactured.

The connection hook must be rigidly securely fastened and with little effort to the first scaffolding element. This is achieved when the bearing surface is maintained essentially flat, and is furthermore designed such that the edge of the bearing surface can be welded to the first scaffolding element, for example, when it enables the application of a fillet weld. A sufficient welding seam length can be achieved when the bearing surface in the cross section of the hollow extruded part appears as a crosswise extending surface wider than the remaining section.

The coupling of the two scaffolding elements via the connection hook is, as a rule, already extraordinarily strong because the connection hook is held in its position by the weight of the first scaffolding element. The safety of the connection is improved when the positive lock of the safety pawl can be frictionally interlocked to the part. Such a frictional interlock can be easily created when the safety pawl is pivotal about an axle which is stationarily fixed in the stem segments, and which is parallel with the longitudinal axis of the part, whereby in a particularly advantageous design a key-shaped pawl edge is provided on the safety pawl in such a manner that it, upon swivelling of the safety pawl, locks the cross section of the part in the hook opening, and in this position creates through a key action a frictional interlock between the pawl edge and a base surface of the part. However, it is also possible to construct a short cam on the safety pawl so that the safety pawl upon swivelling interlocks the cross section of the part in the hook opening, and can itself in this position be frictionally interlocked by a key which can be driven between the safety pawl and the inner bearing surface of the cross segment. It is understood that such a key is removable. Whereas the use of a lock created by means of a key is best suited to lock short cams or other shaped edges provided on the part by the safety pawl, the safety pawls are equipped, if necessary, also with long pawl edges for the purpose of engaging the entire cross section of the part to be locked in the hook opening. The safety pawl can here also be operated by striking it with a suitable tool when a striking edge is provided on the safety pawl so that it can be driven in its closing direction, and in particular when the striking edge projects beyond the stem segments of the connection hook as long as the scaffolding elements are still not yet connected. The demounting occurs here also by means of a striking tool when at least one further striking edge is provided on an area of the pawl containing the pawl edge. A secure fixation of the part is achieved in such a manner that a short holding edge, which is opposite the safety pawl, is provided on the hook opening, which holding edge provides a further positive lock of the connection hook with the part when same conforms to the hook opening so that the cross section of the part is constructed as a beam on two supports and is mounted nonshiftably. As effective is an arrangement in which the shape of the hook opening partially conforms to the shape of the cross section of the part, namely in the portion which serves only as the bearing, not, however, the guiding through portion of the part, the effect can be further improved when the hook opening is dimensioned such that the congruent contours of the hook opening and of the part rest on one another under a slight pressure fitting. The invention creates a safety hook which, by enabling the use of an inexpensive, highly automated manufacturing process enables the creation of a strong and secure connection of the scaffolding elements which can be utilized successfully even in scaffoldings, which must be designed with a particularly high quality for safety and technical purposes.

BRIEF DESCRIPTION OF DRAWING

The invention will be discussed in greater detail hereinafter in connection with one exemplary embodiment and the drawings, in which.

DETAILED DESCRIPTION

Figure 1:
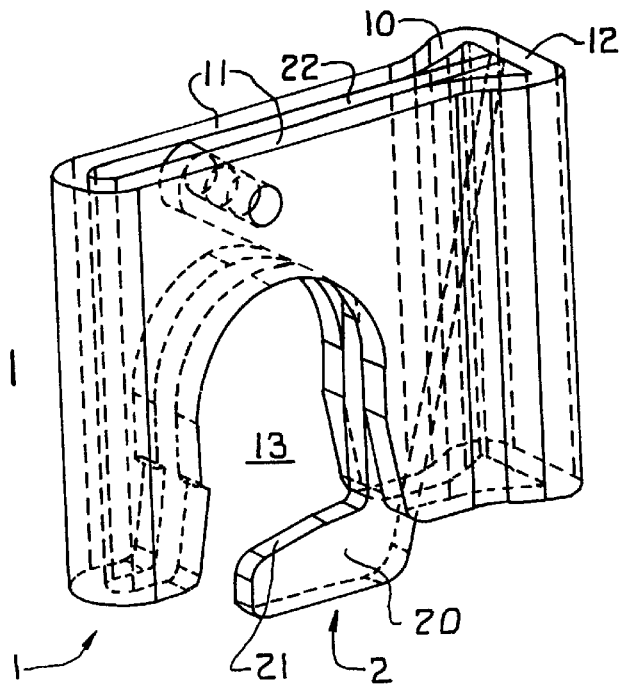
FIG. 1 is a perspective illustration of a connection hook of the invention.
Figure 2:
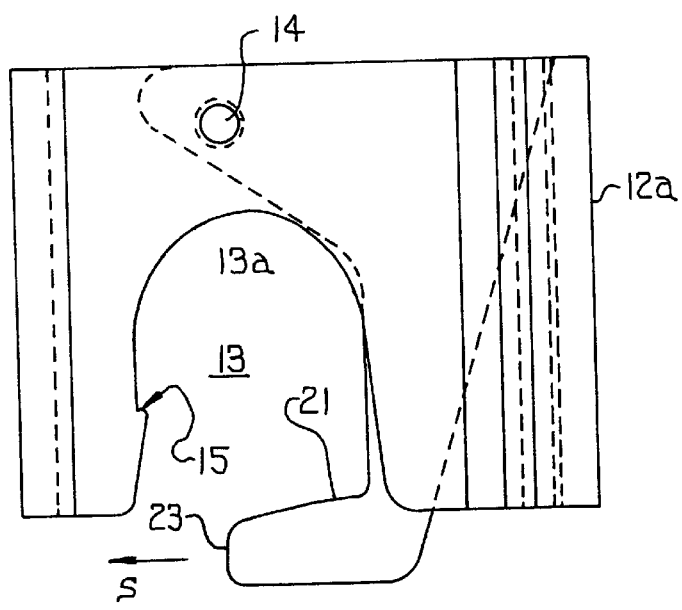
FIGS. 2 and 3 are a front and a top view of the connection hook of FIG. 1, wherein the safety pawl is not shown in the top view.
Figure 3:
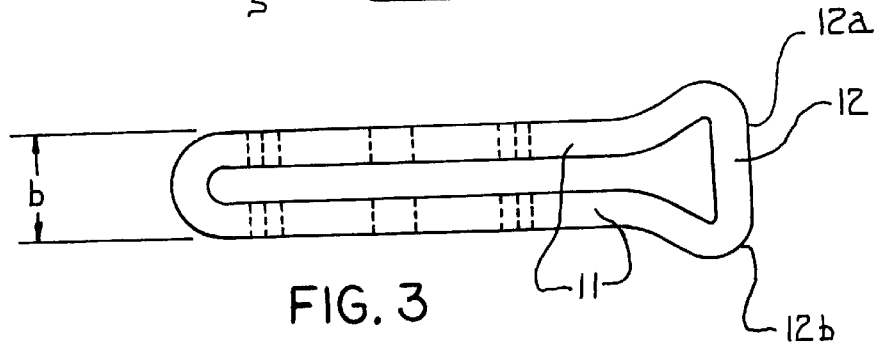
Figure 4:
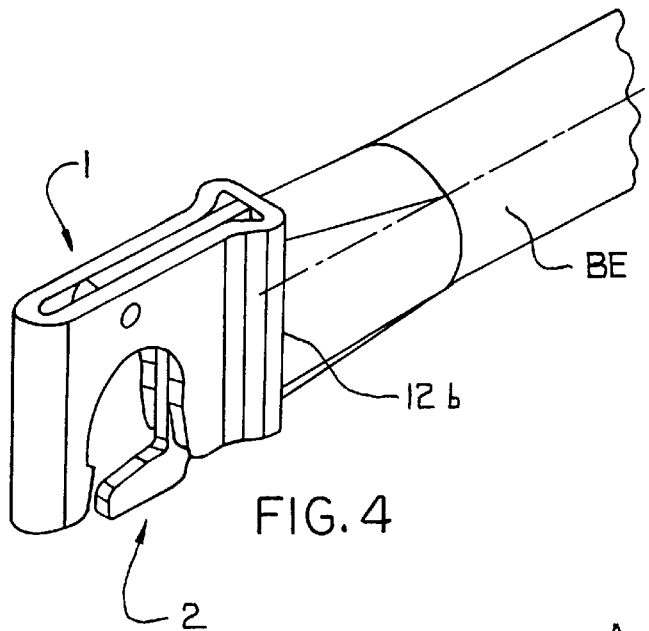
FIG. 4 illustrates the arrangement of a connection hook of the invention on a first scaffolding element.
Figure 5:
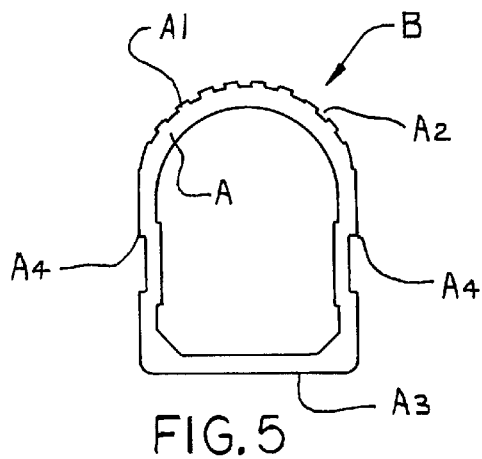
FIG. 5 is a cross-sectional view of a part of a second scaffolding element, which part fits within the connection hook of the invention.
Figure 6:
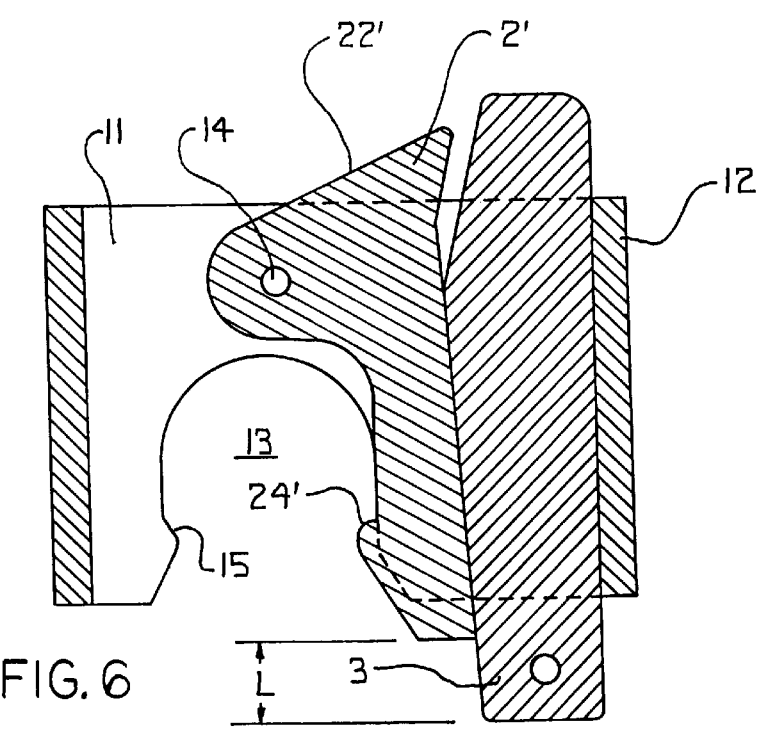
FIG. 6 illustrates a slightly modified design of a connection hook compared with FIGS. 1 to 3, all in a schematically simplified illustration.

A connection hook of the invention consists according to FIGS. 1 to 3 of a hollow extruded part 1 and a safety pawl 2. The hollow extruded part 1 has an approximately T-shaped cross section 10 composed of essentially two parallel surfaced stem segments 11 and a cross segment 12. The stem segments 11 are connected with one another at their ends remote from the cross segment 12 so that the cross section 10 is designed as a closed hollow section. A downwardly directed hook opening 13 is recessed in the surfaced stem segments 11, which hook opening is dimensioned to conform to the cross section A of a part B (FIG. 5), which can also be manufactured as an extruded part. An upper contour 13a of the hook opening 13 is thereby shaped such that it rests flat on a corresponding, upwardly facing contour A1 of the part B when one ignores some grooves A2 interrupting the closed contour A1, which grooves are used to increase the safety of the stepping surface in the example of the part B, because this part B is here also supposed to be used as a ladder rung. The arch of the contour 13a is advantageously dimensioned such that it is capable of providing a slight press fit with the part B. The part B is stationarily mounted on a (second) scaffolding element, not shown in the drawings. The cross segment 12 is designed wider than the width b (FIG. 3) of the stem segments 11, in this manner increasing the resistance moment of the connection hook. At the same time, a relatively large bearing surface 12a is created in this manner, which rests on the first scaffolding part BE to be connected thereto (FIG. 4) and be fastened thereto as by a welding seam. The scaffolding part engages a portion of the edge 12b of the cross segment 12, if necessary, however, also the complete edge 12b. The bearing surface 12a is positioned perpendicularly to the surfaces of the stem segments 11 and of the cross section 10 and is here designed as a flat surface, however, it can also be arched when only the edges 12b rest on the scaffolding element BE and can be welded thereto. The safety pawl 2 is pivotal about an axle 14 (FIG. 2), for example a bolt stationarily positioned above the hook opening 13 on the stem segments 11 and is otherwise formed as a flat sheet-metal part between the stem segments 11, and can thus be manufactured without any difficulty by a simple cutting tool. The stationary axle 14 extends parallel with the longitudinal axis of the part B so that the safety pawl 2 can be swung into the area of the hook opening 13. A key-shaped pawl edge 21 is provided on the safety pawl 2, which pawl edge produces keylike a frictional force on a base surface A3 of the part B when the safety pawl 2 is swung clockwise below the part B located in the hook opening 13. The part B is, in this manner, initially positively connected to the connection hook through a pawl area 20, and this positive lock is secured by the frictional interlock between the pawl edge 21 and the base surface A3. As shown in FIG. 1 and 2, the key-shaped pawl edge 21 is inclined to wedge against the base surface A3 to hold the part B in the hook opening 13. FIGS. 1, 2 and 4 illustrate the safety pawl 2 approximately in the position, in which it is when the part B is securely locked in the hook opening 13. A striking edge 22 (FIG. 1) is hereby just flush with the upper edge of the stem segments 11. However, this striking edge 22 otherwise projects, beyond the stem segments 11 so that it can be driven clockwise to cause the pawl 2 to move in a closing direction S (FIG. 2) with the help of a striking tool. A further impact edge 23 is used for demounting and can, for this purpose, be driven counterclockwise with a striking tool. FIG. 6 is a showing of a slightly modified design. Elements that correspond to above described elements are designated by the same reference numbers. The safety pawl 2' is here designed such that not the base surface A3 of the part B is supported but a short flange A4 at approximately half the height on the part B is supported so that in place of the pawl area 20 only a correspondingly short cam 24' is provided. The flanges A4, which are provided symmetrically on both sides on the part B, rest thus on one side on the cam 24', and on the other side on a holding edge 15, which is constructed on both stem segments 11. Independent of the design of the safety pawl 2, 2', it is achieved in this manner that the part B is pinned within the hook opening 13 like a beam on two supports. One support is thereby formed by the holding edge 15, the other one by the pawl edge 21 or the cam 24'. The safety pawl 2' of FIG. 6 is driven by a key 3, which can be driven between the safety pawl 2' and the (inner) bearing surface of the cross segment 12, and in this manner again secures the positive lock, which is brought about by means of the hook edge 15 or the cam 24' in connection with the flanges A4, through a frictional interlocked connection. The key 3 projects at the top and at the bottom beyond the stem segments 11 so that it can be conveniently driven in and also again removed. The key 3 also extends below the safety pawl 2' a distance L to assist in removing the key 3 and hence the safety pawl 2' and cam 24' from contact against adjacent flange A4.

Although a particular preferred embodiment of the invention has been disclosed in detail for illustrative purposes, it will be recognized that variations or modifications of the disclosed apparatus, including the rearrangement of parts, lie within the scope of the present invention.

I claim:

1. In combination, first and second scaffolding elements and a connection hook for the releasable connection of the first and second elongate scaffolding elements, said second scaffolding element having a profiled part, the connection hook being connected to the first scaffolding element and being placed on said profiled part of the second scaffolding element, the connection hook partially covering said profiled part and being lockable thereto, said profiled part having a base and an upper rounded contour, the connection hook comprising:

(a) an elongated extruded part which is hollow in cross section and has first and second ends, said first end being remote from said second end;

(b) the hollow extruded part having two flat stem segments, the stem segments having parallel surfaces and being spaced from one another so as to define sides of said extruded part, said stem segments having an opening recessed inwardly from said first end and including a closed end and an axle extending between said two spaced stem segments and positioned between said closed end of said opening and said second end, said closed end of said opening partially conforming to said upper contour of said profiled part for receiving said upper contour thereagainst;

(c) a flat, cantilevered one-piece pawl being secured between the two spaced stem segments on said axle, said pawl having a generally C-shape including a first arm connected to said axle, an elongate bight connected to said first arm and extending along one side of said opening, and a second arm connected to said bight remote said first arm, said pawl being swingable, in a locking position thereof, with said second arm partially extending across said opening so as to secure said profiled part in said opening and, in an unlocking position thereof, with said second arm in an unobstructing relation to said opening to such an extent to allow said profiled part to be inserted or removed from said opening, said second arm of said pawl having a key means for positively locking the profiled part in said opening when said pawl is moved between said stem segments into said locking position, said key means having a frictional interlock against said base of said profiled part to urge said profiled part into said opening toward said closed end; and (d) said two stem segments being connected by at least one cross segment of said delongated extruded part, said cross segment defining a bearing surface positioned in a plane parallel to the longitudinal axis of said extruded part and positioned perpendicularly to the parallel surfaces of said stem segments such that the cross segment defines a flange, said flange forming a bear surface for fastening of the connection hook to the first scaffolding element.

2. The connection hook according to claim 1, wherein the bearing surface is essentially flat.

3. The connection hook according to claim 2, wherein an edge of the bearing surface is welded to the first scaffolding element.

4. The connection hook according to claim 1, wherein a crosswise extent of the bearing surface is wider than the remainder of the hollow extruded part.

5. The connection hook according to claim 1, wherein said key means is only on an edge of said second arm of said pawl.

6. The connection hook according to claim 5, wherein the positive lock of the pawl is frictionally interlocked to the profiled part.

7. The connection hook according to claim 1, wherein said profiled part is elongate, and wherein said axle is stationary in said stem segments and is parallel to the longitudinal axis of the profiled part in said locking position.

8. The combination according to claim 1, wherein said second arm includes a short cam on said pawl such that upon pivoting the pawl into said locked position said cam locks the profiled section in the opening, and connection hook includes a key frictionally interlocking said pawl in the locked position, said key being driveable between said pawl and an inner surface of said cross segment.

9. The connection hook according to claim 1, wherein a striking edge is provided on said pawl, said striking edge being driven to Divot said pawl in a closing direction toward said locking position.

10. The connection hook according to claim 9, wherein said striking edge projects beyond said stem segments of the connection hook at least until the first and second scaffolding elements are connected together.

11. The connection hook according to claim 9, wherein the key means includes an edge of said pawl, and at least one further striking edge is provided on a region of the pawl containing the pawl edge.

12. The connection hook according to claim 1, wherein a short holding edge is provided opposite said pawl at the opening, said holding edge providing a further positive lock of the connection hook with the profiled part when the profiled part is received in the opening.

13. The connection hook according to claim 1, wherein said profiled part has grooves therein recessed from an outer surface of said upper contour.

* * * * *